United States Patent
Nakamura

(10) Patent No.: US 8,127,812 B2
(45) Date of Patent: Mar. 6, 2012

(54) PNEUMATIC TIRE HAVING CAP TREAD INCLUDING CROSSLINKED RUBBER PARTICLES

(75) Inventor: Norihiko Nakamura, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 1120 days.

(21) Appl. No.: 11/953,192

(22) Filed: Dec. 10, 2007

(65) Prior Publication Data
US 2008/0169053 A1    Jul. 17, 2008

(30) Foreign Application Priority Data
Jan. 12, 2007   (JP) .................................... 2007-4364

(51) Int. Cl.
*B60C 1/00*    (2006.01)
*B60C 11/00*   (2006.01)

(52) U.S. Cl. .................. 152/209.4; 152/209.5; 152/211

(58) Field of Classification Search ............... 152/209.4, 152/209.5, 211
See application file for complete search history.

(56) References Cited

U.S. PATENT DOCUMENTS

| | | | |
|---|---|---|---|
| 5,409,969 A | 4/1995 | Hamada | |
| 5,780,538 A | 7/1998 | Cohen et al. | |
| 6,133,364 A | 10/2000 | Obrecht et al. | |
| 6,184,296 B1 * | 2/2001 | Obrecht et al. | 525/232 |
| 6,403,720 B1 | 6/2002 | Chino et al. | |
| 6,632,888 B2 * | 10/2003 | Obrecht et al. | 525/215 |
| 7,131,474 B2 * | 11/2006 | Sandstrom | 152/209.5 |
| 2006/0128868 A1 * | 6/2006 | Martter et al. | 152/209.5 |
| 2007/0232733 A1 * | 10/2007 | Ziser et al. | 524/386 |
| 2008/0295935 A1 * | 12/2008 | Kobayashi et al. | 152/209.1 |
| 2010/0152370 A1 * | 6/2010 | Steinhauser et al. | 524/572 |

FOREIGN PATENT DOCUMENTS

| | | | |
|---|---|---|---|
| JP | 2005-146053 | | 6/2005 |
| JP | 2006-089552 | * | 4/2006 |
| JP | 2006-213803 | * | 8/2006 |
| WO | 2005/033186 | * | 4/2005 |
| WO | 2006/016512 | * | 2/2006 |

OTHER PUBLICATIONS

Machine translation for Japan 2006-213803 (no date).*
Machine translation for Japan 2006-089552 (no date).*

* cited by examiner

*Primary Examiner* — Steven D Maki
(74) *Attorney, Agent, or Firm* — Fish & Richardson P.C.

(57) ABSTRACT

A pneumatic tire capable of improving the wet performance and the low fuel cost performance at a good balance without deteriorating other properties of the tire such as abrasion resistance has a cap tread disposed to the radial outside of a tire and a base tread disposed to the radial inside of a tire in a tread portion, in which the cap tread rubber comprises a rubber compound containing a dienic rubber, and at least 15 parts by weight of modified styrene butadiene rubber and/or modified butadiene rubber modified at a polymer molecule terminal group with at least one functional group in 100 parts by weight of the rubber ingredient and containing 1 to 60 parts by weight of crosslinked rubber particles with an average grain size of 5 to 2,000 nm and a glass transition temperature of $-100$ to $-65°$ C., and modified with sulfur and a compound having a C=C double bond and having a hydroxyl group based on 100 parts by weight of the rubber ingredient.

7 Claims, No Drawings

PNEUMATIC TIRE HAVING CAP TREAD INCLUDING CROSSLINKED RUBBER PARTICLES

BACKGROUND OF THE INVENTION

1. Field of the Invention

The present invention concerns a pneumatic tire and, more specifically, relates to a pneumatic tire excellent in wet performance and low fuel cost performance.

2. Description of Related Art

In recent years, a demand for decreasing the fuel cost of cars has been increased and technical development capable of coping with lowering of the rolling resistance of tires and the decrease in the fuel cost has been conducted. On the other hand, it has also been demanded for the improvement of moving characteristic, braking and driving performance, abrasion resistance, etc. of tires or improving the driveability or safety of cars.

As the technique of compatibilizing the tire performances described above, a technique of compounding silica in place of or in combination with existent carbon black as a reinforcing filler for rubber compounds used for treads has been disclosed and known by Japanese Patent Application Kokai No. 10-1565.

In addition to the silica compounding technique, Japanese Patent Application Kokai No. 2001-139729 further discloses a technique of compounding a gelled rubber to a rubber compound for making the wet performance and the low fuel cost performance compatible. As described in Japanese Patent Application Kokai No. 2001-139729, while a gelled rubber with a toluene swelling index (Qi) of 15 or more has a performance as a rubber and the tire performance can be improved relatively easily by selecting a gelled rubber having an appropriate glass transition temperature Tg. However, in a case where gelled rubber entangles to each other, it is difficult to uniformly disperse the gelled rubber which sometimes gives undesired effect on the processability or rubber property of the obtained rubber.

For the improvement of the processability and the rubber property as the problem described above, Japanese Patent Application Kokai No. 2005-146053 proposes a rubber compound for use in a tire tread having 100 parts by weight of a rubber ingredient comprising 5 to 50 parts by weight of a gelled rubber with a toluene swelling index (Qi) of 16 to 70, 5 to 90 parts by weight of a dienic rubber synthesized by living anion polymerization and 0 to 45 parts by weight of other dienic rubber, 5 to 100 parts by weight of silica, and 0 to 100 parts by weight of other filler.

According to the technique described in Japanese Patent Application Kokai No. 2005-146053, while the processability and the wet performance of the tire are considered excellent, it does not discloses the compatibility with the low fuel cost performance and it mentions nothing at all for the effect given on other properties of the tire such as abrasion resistance.

SUMMARY

The invention intends to provide a pneumatic tire capable of improving the wet performance and the low fuel cost performance in a well balanced manner without deteriorating other properties of the tire such as abrasion resistance.

The invention provides a pneumatic tire having a cap tread disposed to the radial outside of a tire and a base tread disposed to the radial inside of a tire in a tread portion, in which the cap tread rubber comprises a rubber compound containing a dienic rubber, and at least 15 parts by weight of modified styrene butadiene rubber and/or modified butadiene rubber modified at a polymer molecule terminal group with at least one functional group in 100 parts by weight of the rubber ingredient and containing 1 to 60 parts by weight of crosslinked rubber particles with an average grain size of 5 to 2,000 nm and a glass transition temperature of −100 to −65° C., and modified with sulfur and a compound having a C=C double bond and having a hydroxyl group based on 100 parts by weight of the rubber ingredient.

In the invention, the functional group is, preferably, an amino group, epoxy group, hydroxyl group, alkyl silyl group, polysiloxane group, carboxyl group, or lactam group.

The rubber particles preferably have a toluene swelling index (Qi) from 1 to 15.

Further, the rubber compound preferably contains from 20 to 100 part by weight of silica based on 100 parts by weight of the rubber ingredient.

EMBODIMENTS OF THE INVENTION

The rubber ingredient used in the rubber compound according to an embodiment of the invention is a dienic rubber. The dienic rubber includes natural rubber (NR), isoprene rubber (IR), styrene-butadiene rubber (SBR), and butadiene rubber (BR) which can be used each alone or as a blend rubber of two or more of them.

In the embodiment of the invention, 15 parts by weight or more of a modified styrene-butadiene rubber (M-SBR) and/or modified butadiene rubber (M-BR) modified at the polymer molecule terminal end group with at least one functional group in 100 parts by weight of the rubber ingredient.

Since the modified polymer is applied to the cap tread constituting the grounding surface of the tread, M-SBR or M-BR is used with a view point of maintaining and improving the economical and the property of the tire such as abrasion resistance, rolling resistance, and grip performance, and can be used as a blend by combination with the dienic rubber depending on the size and the application use of the tire.

For the modified polymer, a highly reactive functional group is introduced to the molecule terminal end of the polymer chain to modify the polymer, and preferred functional group includes, for example, an amino group, epoxy group, hydroxyl group, alkylsilyl group, polysiloxane group, carboxyl group, or lactam group. Two or more of such functional groups may be introduced for modification.

The modified polymer is modified at the terminal end by reacting a compound having a functional group to a living polymer polymerized by using, for example, a lithium initiator and the terminal modification can be conducted by a known method.

In the modified polymer, the functional group introduced to the molecule terminal end can improve the affinity of the surface of the rubber particle with the hydroxyl group, suppress coagulation between the rubber particles to each other to enhance the dispersibility in the rubber and can provide a rubber compound with excellent feature of the wet performance and the low fuel cost performance of the rubber particle. In a case where the amount of the modified polymer in the rubber ingredient is less than 15 parts by weight, the effect of improving the fuel cost is particularly insufficient. The content of the modified polymer is preferably 30 parts by weight or more and the upper limit is not particularly restricted.

Further, the modified polymer also serves to assist the dispersion of silica particles by interaction with silanol groups on the silica surface and can also improve the processability of the silica compound and the rubber property and reduce the amount of the silane coupling agent.

The rubber particles used in the embodiment of the invention are crosslinked rubber particles with an average grain size of 5 to 2,000 nm and a glass transition temperature of −100 to −65° C. and modified with sulfur and a compound having a C=C double bond and having a hydroxyl group (OH group).

By compounding such rubber particles in combination with the modified polymer described above, it is possible to suppress the coagulation between the rubber particles to each other to enhance the dispersiblity in the rubber, improve the reinforcing effect, and improve the wet performance and the fuel cost performance without deteriorating the rubber property such as abrasion resistance.

The rubber particles have an average grain size (DVN value according to DIN 53206) of 5 to 2,000 nm, preferably, 20 to 600 nm and, more preferably, 40 to 200 nm. In a case where the average grain size is within the range described above, it is possible to maintain the processability and the reinforcing effect of the rubber compound and can develop the wet performance and the low fuel cost performance without deteriorating abrasion resistance or the like.

For the rubber particles, those having a glass transition temperature (Tg) of −100 to −65° C. are used. In a case where Tg is lower than −100° C., the wet performance tends to be lowered. On the other hand, in a case where it exceeds −65° C., the fuel cost performance is worsened. Tg is measured according to JIS K7121.

Further, rubber particles preferably have a toluene swelling index (Qi) of 1 to 15. Qi is more preferably from 1 to 10. In a case where Qi is less than 1, it is difficult to ensure the rubber property such as strength or the modulus of elasticity. On the other hand, in a case where it exceeds 15, the particle is softened to lose the reinforcing effect and lower the strength or the abrasion resistance.

Further, it is preferred that the gel content of the rubber particles is 94% by weight or more. In a case where the gel content is less than 94% by weight, the modulus of elasticity tends to be lowered to give undesired effects also on the rubber compound to which they are compounded.

In this case, Qi is a value obtained by swelling 250 mg of rubber particles in 25 ml of toluene under shaking for 24 hours, then centrifugally separating them to separate the gel from the solvent, which is weighed (wet weight) and then drying the same till the weight is settled at 70° C., weighing the dry weight according to the following equation:

$Qi$=weight weight/dry weight

Further, the gel content is a weight ratio (%) of the dried rubber particles based on the rubber particles used.

The rubber particle is a gelled rubber obtained by crosslinking a not-vulcanized rubber liquid dispersion. The rubber liquid dispersion includes a rubber latex prepared by emulsion polymerization, a natural rubber latex or a rubber liquid dispersion obtained by emulsifying a solution polymerized rubber in water. The constituent rubber ingredient includes dienic rubber such as NR, IR, SBR, BR, nitrile rubbers and chloroprene rubber and they are preferably NR, BR, SBR or a compounded rubber of them with other dienic rubber.

The crosslinker for the rubber particles includes sulfur type crosslinkers such as sulfur and organic sulfur compounds, and crosslinkers, for example, of organic peroxides and organic azo compounds may also be used together.

Further, the rubber particle is modified with sulfur and a compound having a C=C double bond and having a hydroxyl (OH) group. That is, a sulfur-crosslinked rubber particle based on the dienic rubber is modified by using a compound having the OH group as a modifying agent. Such modification is described, for example, in Japanese Patent Application Kohyo No. 2004-506058 and the modifying agent includes, for example, hydroxybutylacrylate or methacrylate, hydroxyethyl acrylate or methacrylate, and hydroxypropyl acrylate or methacrylate. The OH group modification can improve the affinity between the modified polymer or the silica surface with the functional group as described above to further improve the wet performance and the low fuel cost performance.

The rubber particles are compounded by 1 to 60 parts by weight based on 100 parts by weight of the rubber ingredient. In a case where the compounding amount is less than 1 part by weight, the effect due to the rubber particle cannot be developed in the rubber compound. On the other hand, in a case where it exceeds 60 parts by weight, the abrasion resistance tends to be lowered. Such rubber particles are marketed and can be used as "MICROMOF" series, trade name of products manufactured by Rhein Chemie Co.

Further, as the reinforcing filler for the rubber compound, 20 to 100 parts by weight of silica is preferably compounded base on 100 parts by weight of the rubber ingredient. This further attains a balance for compatibility between the wet performance and the low fuel cost performance. In a case where the compounding amount of the silica is less than 20 parts by weight, the wet performance is less improved. In a case where it exceeds 100 parts by weight, the viscosity of not-vulcanized rubber increases to deteriorate the moldability and the processability of the rubber.

While the type of the silica is not particularly restricted, a wet-process silica having a nitrogen adsorption specific surface area (BET) of 100 to 250 m$^2$/g, and a DBP oil absorption amount of 100 ml/100 g or more is preferred in view of the reinforcing effect and the processability, and commercial products such as NIPSIL AQ, VN3, manufactured by Tosoh Silica Corporation and ULTRASIL VN3 manufactured by Degussa AG can be used. Further, a silane coupling agent such as bis(triethoxysilyl propyl)-tetrasulfide, bis(triethoxysilyl propyl)disulfide, or triethoxysilyl propyl isocyanate is used in combination and they are used by 5 to 15% by weight and, preferably, 5 to 10% by weight based on the amount of silica as the compounding amount. In a case where the compounding amount of the silane coupling agent is less than 5% by weight, the silica dispersion is worsened and the rubber property such as strength or modulus of elasticity tends to be lowered. In a case where it exceeds 10% by weight, the effect of the coupling agent shows less effect in view of addition tending to increase the cost.

Naturally, inorganic fillers such as carbon black, clay, or calcium carbonate used generally for tires may also be compounded as the reinforcing agent other than silica.

In a case of using the carbon black, carbon black of SAF, ISAF, or HAF class is preferably compounded. The compounding amount of the carbon black is preferably 5 to 50 parts by weight based on 100 parts by weight of the rubber ingredient.

In addition, the rubber compound can be properly compounded further with those additives used generally for tire tread rubbers, for example, process oil, anti-aging agent, stearic acid, zinc oxide, wax, resins, vulcanizer, and vulcanization promoter.

The pneumatic tire of the embodiment of the invention is manufactured by a usual method. That is, the rubber compound described above is kneaded by a usual processing method, for example, by using a roll, a banbury mixer, or a kneader. The obtained rubber compound is extruded together with a rubber compound for a base rubber prepared by separately into a shape of a cap/base 2-layered structure tread, a non-vulcanized tire is molded by a usual method on a tire molding machine and can be molded under vulcanization in a vulcanizing machine to produce a tire.

The pneumatic tire of the embodiment of the invention is applicable to tires of various application uses such as those tires for passenger cars, light-trucks, and large size cars such as trucks and buses.

EXAMPLE

The present invention is described specifically with reference to examples but the invention is not restricted to the examples.

In accordance with the compounding formulation (parts by weight) described in Table 1, rubber compounds for use in cap rubber in examples and comparative examples were kneaded and prepared by a customary method using a 200 liter volume banbury mixer. The rubber ingredients and the compounding agent used are as described below. Further, common compounding ingredients and compounding amount are as described below.

[Rubber Ingredient]

Terminal OH group-modified styrene-butadiene rubber (modified SBR): "Tufdene E10" manufactured by Asai Kasei Co.

Styrene-butadiene rubber (SBR): "Tufdene 1000" manufactured by Asai Kasei Co.

Butadiene rubber (BR): "BR150" manufactured by Ube Industries, Ltd.

Rubber particle-A: "MICROMOF 30B" manufactured by Rhein Chemie Co., BR based gelled rubber particles, average grain size=130 nm, Tg=−80° C., Qi=5.9, gel content=97 wt %.

Rubber particle-B: "MICROMOF3B" manufactured by Rhein Chemie Co., SBR based gelled rubber particles, average grain size=60 nm, Tg=−60° C., Qi=5.9, gel content=97 wt %.

Rubber particles-C: "VP601" supplied from Sanyo Trading Co., silicone rubber-based gelled rubber particles, average grain size=100 nm, Tg=−115 to −120° C.

[Common Ingredient]

Silica: variable amount (Ultrasil VN3, manufactured by Degussa AG)

Silane coupling agent: variation amount (Si69, manufactured by Degussa AG)

Aroma oil: 30 parts by weight (X-140, manufactured by Japan Energy. Co.)

Anti-aging agent 6C: 2 parts by weight (Nocrac 6C, manufactured by Ouchi Shinko Chemical Industrial Co.)

Stearic acid: 2 parts by weight (Lunac S-20, manufactured by Kao Corp.)

Zinc oxide: 3 parts by weight (zinc powder No. 1, manufactured by Mitsui Metal Mining Co.)

Paraffin wax: 2 parts by weight (Ozoace 0355, manufactured by Nippon Seiro Co.)

Sulfur: 2 parts by weight (5% oil processed powder sulfur, manufactured by Hosoi Chemical Industry Co.)

Vulcanization promoter: 1.5 parts by weight (Nocceler-NS-P, manufactured by Ouchi Shinko Chemical Co.)

The dynamic visoelastic property (loss factor tan δ), abrasion resistance, and wet performance of each of the rubber compounds were evaluated in accordance with the following test methods. The results are shown in Table 1.

[Tan δ]

The loss factor tangent δ was measured by using a dynamic viscoelastic measuring instrument (manufactured by Ueshima Seisakusho Co.) according to JIS K 6394 under the conditions at a frequency of 50 Hz, a dynamic strain of 1.0% and a temperature of 50° C. It is indicated by an index assuming that for Comparative Example 1 as 100. Smaller value shows lower tan δ, and better fuel consumption property.

[Wear Resistance]

Abrasion loss was measured using a Lamboum abrasion test machine (manufactured by Iwamoto Seisakusho Co.), according to JIS K 6264 under the condition at a load of 3 kg, a slip ratio of 20%, and a temperature of 23° C. It is indicated by an index while assuming that of Comparative Example 1 as 100 and a larger value shows better abrasion resistance.

[Wet Performance]

The rebound resilience (%) was measured by using a Lupke type rebound resilience tester according to JIS K 6301. It is indicated by an index assuming that for Comparative Example 1 as 100. A larger value shows higher rebound resilience and better wet performance.

TABLE 1

| | | Example 1 | Example 2 | Example 3 | Example 4 | Com. Example 1 | Com. Example 2 | Com. Example 3 | Com. Example 4 | Com. Example 5 |
|---|---|---|---|---|---|---|---|---|---|---|
| Compound (part by weight) | Modified SBR | 70 | 70 | 70 | 30 | 70 | 70 | 70 | 70 | |
| | SBR | | | | 40 | | | | | 70 |
| | BR | 30 | 30 | 30 | 30 | 30 | 30 | 30 | 30 | 30 |
| | Rubber particle-A | 10 | 30 | 50 | 10 | | | | 70 | 10 |
| | Rubber particle-B | | | | | | 10 | | | |
| | Rubber particle-C | | | | | | | 10 | | |
| | Silica | 70 | 70 | 60 | 70 | 70 | 70 | 70 | 50 | 70 |
| | Silane coupling agent | 6 | 6 | 5 | 6 | 6 | 6 | 6 | 4 | 6 |
| Result | tan δ (index) | 95 | 97 | 95 | 98 | 100 | 105 | 90 | 95 | 98 |
| | Abrasion resistance (factor) | 110 | 105 | 100 | 105 | 100 | 105 | 110 | 90 | 105 |

TABLE 1-continued

|  | Example 1 | Example 2 | Example 3 | Example 4 | Com. Example 1 | Com. Example 2 | Com. Example 3 | Com. Example 4 | Com. Example 5 |
|---|---|---|---|---|---|---|---|---|---|
| Rebound resilience (factor) | 100 | 105 | 105 | 100 | 100 | 105 | 95 | 108 | 100 |

Existent crosslinked rubber particles having hydroxyl groups on the surface tended to be coagulated due to affinity between functional groups per se, were insufficient for the dispersibility in the rubber and could not provide a sufficient effect of the rubber particles. In the invention, by the use of the modified polymer modified at the terminal by the functional group as the rubber ingredient, the affinity between the rubber particle and the modified polymer is improved to enhance the dispersibility of the rubber particles into the rubber, develop the feature of the rubber particles to the rubber compound, and can improve the wet performance and the low fuel performance at a good balance without deteriorating other characteristics such as abrasion resistance by using the same for the cap tread rubber of a pneumatic tire.

The pneumatic tire according to the invention can be mounted and used in vehicles irrespective of the tire size for various application uses such as for passenger cars, as well as those for light-trucks and large size cars such as trucks and buses.

What is claimed is:

1. A pneumatic tire having a cap tread disposed to the radial outside of a tire and a base tread disposed to the radial inside of a tire in a tread portion, in which
   the cap tread rubber comprises a rubber composition which includes:
   a rubber ingredient containing a dienic rubber, and at least 15 parts by weight of modified styrene butadiene rubber and/or modified butadiene rubber modified at a polymer molecule terminal group with at least one functional group in 100 parts by weight of the rubber ingredient, and
   1 to 60 parts by weight of crosslinked rubber particles having sulfur and a C═C double bond, modified with a compound having a hydroxyl group, and having an average grain size of 5 to 2,000 nm and a glass transition temperature of −100 to −80° C., based on 100 parts by weight of the rubber ingredient.

2. The pneumatic tire according to claim 1, wherein the functional group comprises an amino group, epoxy group, hydroxyl group, alkylsilyl group, polysiloxane group, carboxyl group, or lactam group.

3. The pneumatic tire according to claim 1 or 2, wherein the rubber particles have a toluene swelling index (Qi) of from 1 to 15.

4. The pneumatic tire according to claim 3, wherein the rubber composition contains from 20 to 100 parts by weight of silica based on 100 parts by weight of the rubber ingredient.

5. The pneumatic tire according to claim 1 or 2, wherein the rubber composition contains from 20 to 100 parts by weight of silica based on 100 parts by weight of the rubber ingredient.

6. The pneumatic tire according to claim 5, wherein the functional group comprises a hydroxyl group.

7. The pneumatic tire according to claim 1, wherein the functional group comprises a hydroxyl group.

* * * * *